(12) United States Patent
Morishima et al.

(10) Patent No.: US 12,533,987 B2
(45) Date of Patent: Jan. 27, 2026

(54) ELECTRIC VEHICLE MANAGEMENT DEVICE AND ELECTRIC VEHICLE MANAGEMENT SYSTEM

(71) Applicant: TOYOTA JIDOSHA KABUSHIKI KAISHA, Toyota (JP)

(72) Inventors: Akinori Morishima, Naka-gun (JP); Tohru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 629 days.

(21) Appl. No.: 18/054,993

(22) Filed: Nov. 14, 2022

(65) Prior Publication Data
US 2023/0256861 A1    Aug. 17, 2023

(30) Foreign Application Priority Data
Feb. 17, 2022    (JP) .................... 2022-023166

(51) Int. Cl.
*B60L 58/12*    (2019.01)
*B60L 53/66*    (2019.01)

(52) U.S. Cl.
CPC ............ *B60L 58/12* (2019.02); *B60L 53/665* (2019.02)

(58) Field of Classification Search
CPC .......... B60L 2240/34; B60L 2240/622; B60L 2240/80; B60L 2260/54; B60L 53/64; B60L 53/665; B60L 53/68; B60L 58/12; B60L 58/24; G06Q 10/0631; Y02T 10/7072; Y02T 90/12; Y02T 90/16; Y02T 10/70

USPC ......................................................... 700/291
See application file for complete search history.

(56) References Cited

U.S. PATENT DOCUMENTS

| | | | |
|---|---|---|---|
| 2010/0138066 A1* | 6/2010 | Kong | G06Q 30/0601 705/317 |
| 2010/0292855 A1* | 11/2010 | Kintner-Meyer | B60L 53/64 700/36 |
| 2011/0246259 A1* | 10/2011 | Hostyn | H02J 3/008 705/412 |
| 2015/0069970 A1* | 3/2015 | Sarkar | B60L 53/14 320/109 |
| 2016/0164329 A1 | 6/2016 | Hashimoto et al. | |
| 2018/0118045 A1* | 5/2018 | Gruzen | B60L 53/665 |
| 2020/0160461 A1* | 5/2020 | Kaniki | H02J 7/0013 |
| 2022/0122163 A1* | 4/2022 | Obata | G06Q 30/0206 |

FOREIGN PATENT DOCUMENTS

| | | | | |
|---|---|---|---|---|
| JP | 2020-150717 A | | 9/2020 | |
| KR | 20210077810 A | * | 6/2021 | ......... G01C 21/3667 |
| WO | WO 2015/008624 A1 | | 1/2015 | |

* cited by examiner

*Primary Examiner* — Chun Cao
(74) *Attorney, Agent, or Firm* — Finnegan, Henderson, Farabow, Garrett and Dunner, LLP (57) ABSTRACT

An electric vehicle management device manages an electric vehicle that is chargeable by an electric power system. The electric vehicle management device performs a state-of-charge (SOC) adjustment process for adjusting the SOC of the traveling electric vehicle based on a prediction value of a market price calculated based on information of a market price of electric power.

9 Claims, 5 Drawing Sheets

ELECTRIC VEHICLE MANAGEMENT DEVICE AND ELECTRIC VEHICLE MANAGEMENT SYSTEM

CROSS-REFERENCE TO RELATED APPLICATION

This application claims priority to Japanese Patent Application No. 2022-023166 filed on Feb. 17, 2022, incorporated herein by reference in its entirety.

BACKGROUND

1. Technical Field

The present disclosure relates to an electric vehicle management device and an electric vehicle management system.

2. Description of Related Art

In Japanese Unexamined Patent Application Publication No. 2020-150717, a supply and demand management server that adjusts electric power consumption (generated electric power) of an electric vehicle based on an electric power supply and demand prediction value, which is a difference between the electric power demand prediction amount and the electric power supply prediction amount of an electric power system, is disclosed.

SUMMARY

In the supply and demand management server described in JP 2020-150717 A, the electric power consumption (generated electric power) of the electric vehicle is adjusted based on the electric power supply and demand prediction value in the electric power system as described above. However, the supply and demand management server does not make the above adjustment in consideration of the price of the electric power. Therefore, for example, when the electric power consumption of the electric vehicle is adjusted to be high when the price of the electric power is high, the cost for the next charging of the electric vehicle will be high. Therefore, in the control by the above-described supply and demand management server, it is considered that a user of the electric vehicle may feel financial anxiety (dissatisfaction) with respect to the charging of the electric vehicle.

The present disclosure provides an electric vehicle management device and an electric vehicle management system capable of reducing an amount of financial anxiety (dissatisfaction) a user of an electric vehicle feels with respect to charging of the electric vehicle.

An electric vehicle management device according to a first aspect of the present disclosure manages an electric vehicle that is chargeable by an electric power system. The electric vehicle management device includes that a communication unit configured to acquire information on a market price of electric power by communication, and communicate with the electric vehicle, and a control unit configured to calculate a prediction value of the market price based on the information on the market price acquired by the communication unit. The control unit is configured to perform a state-of-charge (SOC) adjustment process for adjusting the SOC of the electric vehicle during traveling based on the calculated prediction value.

In the above configuration, as described above, the SOC adjustment process for adjusting the SOC of the electric vehicle during traveling is performed based on the calculated prediction value of the market price of the electric power. This makes it possible to adjust the SOC of the electric vehicle during traveling based on the prediction value of the market price of the electric power. As a result, the SOC can be easily adjusted based on the prediction value of the market price such that the user's financial burden due to the charging of the electric vehicle is reduced. Thus, it is possible to reduce the amount of financial anxiety (dissatisfaction) the user of the electric vehicle feels.

In the first aspect, the control unit may be configured to perform the SOC adjustment process based on a magnitude correlation between the prediction value and a predetermined threshold price. Therefore, the SOC adjustment process can be performed only by comparing the prediction value of the market price with the predetermined threshold price (without performing complicated calculations). As a result, the control load on the control unit due to the SOC adjustment process can be reduced.

In the first aspect, the predetermined threshold price may include the first threshold price, the SOC adjustment process may include an SOC reduction process for reducing a decrease in the SOC of the electric vehicle during traveling, and the control unit may be configured to perform the SOC reduction process when the prediction value is equal to or higher than the first threshold price. Therefore, the SOC reduction process can be performed only by comparing the prediction value of the market price with the first threshold price (without performing complicated calculations). As a result, the control load on the control unit due to the SOC reduction process can be reduced.

In the first aspect, the SOC reduction process may include a first process for lowering an output upper limit value of a temperature controller of the electric vehicle as compared with the case where the prediction value is less than the first threshold price. As a result, it is possible to further reduce the decrease in the SOC due to the decrease in the output upper limit value of the temperature controller of the electric vehicle as compared with the case where the prediction value is less than the first threshold price.

In the first aspect, the SOC reduction process may include a second process for limiting an output of a motor generator of the electric vehicle without performing a process for lowering the output upper limit value of the temperature controller of the electric vehicle. As a result, it is possible to easily reduce the decrease in the SOC by limiting the output of the motor generator while preventing the user of the electric vehicle from feeling uncomfortable due to the lowering of the output upper limit value of the temperature controller.

In the first aspect, the predetermined threshold price may include a second threshold price smaller than the first threshold price, the SOC adjustment process may include an SOC promotion process for promoting a decrease in the SOC of the electric vehicle during traveling, and the control unit may perform the SOC promotion process when the prediction value is equal to or less than the second threshold price. Therefore, the SOC promotion process can be performed only by comparing the prediction value of the market price with the second threshold price (without performing complicated calculations). As a result, the control load on the control unit due to the SOC promotion process can be reduced.

In the first aspect, the control unit may detect a scheduled time at which next charging is executed, may calculate the prediction value at the scheduled time, and may perform the SOC adjustment process based on the prediction value. This makes it possible to adjust the SOC based on the market price at the time when charging is actually performed. As a result, it is possible to more reliably reduce the amount of financial anxiety (dissatisfaction) the user of the electric vehicle feels.

In the first aspect, the control unit may detect a scheduled time at which next charging is executed, and may perform the SOC adjustment process based on detection of the scheduled time. Therefore, electric vehicles that are not scheduled to be charged the next time can be excluded from the SOC adjustment process.

In the first aspect, the control unit may calculate the prediction value before the gate closure of the electric power trading market. This makes it possible to calculate the prediction value of a market price of the electric power market before the gate closure when electric power trading can be made in the market.

An electric vehicle management system according to a second aspect of the present disclosure includes an electric vehicle that is chargeable by an electric power system, and an electric vehicle management device configured to manage the electric vehicle. The electric vehicle management device includes a communication unit configured to acquire information on a market price of electric power by communication and communicate with the electric vehicle, and a control unit configured to calculate a prediction value of the market price based on the information on the market price acquired by the communication unit. The control unit is configured to perform a process for adjusting an SOC of the electric vehicle during traveling based on the calculated prediction value.

In the above configuration, as described above, the SOC adjustment process for adjusting the SOC of the electric vehicle during traveling is performed based on the calculated prediction value of the market price of the electric power. This makes it possible to adjust the SOC of the electric vehicle during traveling based on the prediction value of the market price of the electric power. As a result, the SOC can be easily adjusted based on the prediction value of the market price such that the user's financial burden due to the charging of the electric vehicle is reduced. Thus, it is possible to provide the electric vehicle management system that can reduce the amount of financial anxiety (dissatisfaction) the user of the electric vehicle feels.

With each aspect of the present disclosure, it is possible to reduce the amount of financial anxiety (dissatisfaction) the user of the electric vehicle feels with the charging of the electric vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail with reference to the drawings. In the figures, the same or corresponding parts are designated by the same reference numerals and letters and the description thereof will not be repeated.

Figure 1:
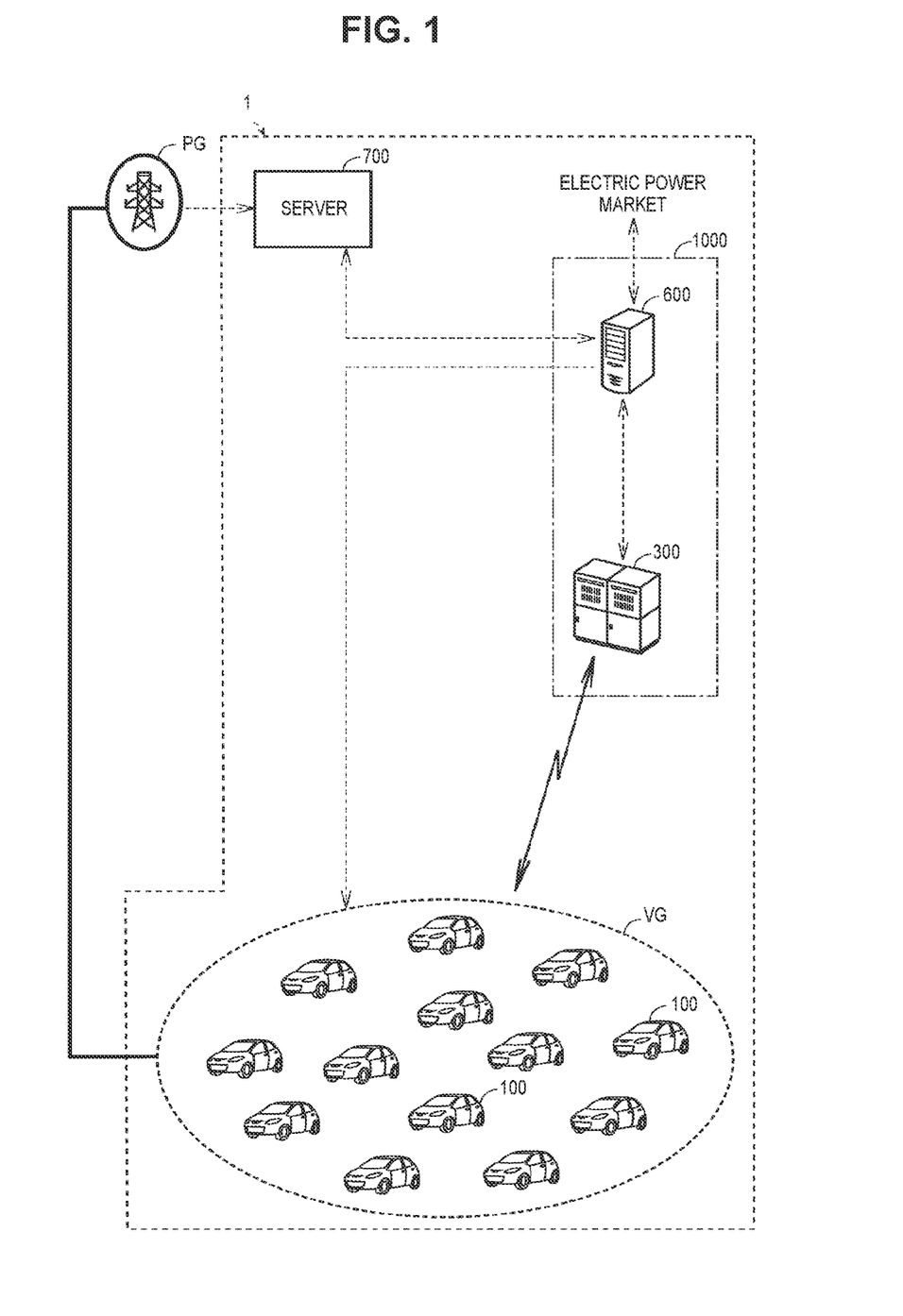
FIG. 1 is a diagram illustrating a schematic configuration of an electric vehicle management system according to an embodiment of the present disclosure.

FIG. 1 is a diagram illustrating a schematic configuration of an electric vehicle management system 1 according to the embodiment of the present disclosure. As illustrated in FIG. 1, the electric vehicle management system 1 includes a vehicle group VG (electric vehicle 100), a server 700, and an electric vehicle management device 1000. The electric vehicle management device 1000 includes a server 300 and a server 600. Each of the server 300 and the server 600 correspond to a management computer.

An electric power system PG is an electric power grid constructed by power transmission and distribution equipment. A plurality of power plants is connected to the electric power system PG. The electric power system PG receives electric power from those power plants. In this embodiment, the electric power company maintains and manages the electric power system PG (commercial electric power source). The electric power company corresponds to a system operator (TSO) described below. The electric power system PG supplies alternating current electric power (for example, three-phase alternating current electric power). The server 700 corresponds to a computer (hereinafter, may be referred to as "TSO server") belonging to the TSO. The server 600 and the server 700 are configured to be able to communicate with each other.

The server 300 manages the vehicle group VG. The server 300 periodically communicates with each electric vehicle 100 included in the vehicle group VG. The number of electric vehicles 100 included in the vehicle group VG may be five or more and less than 30, 30 or more and less than 100, or 100 or more.

Figure 2:
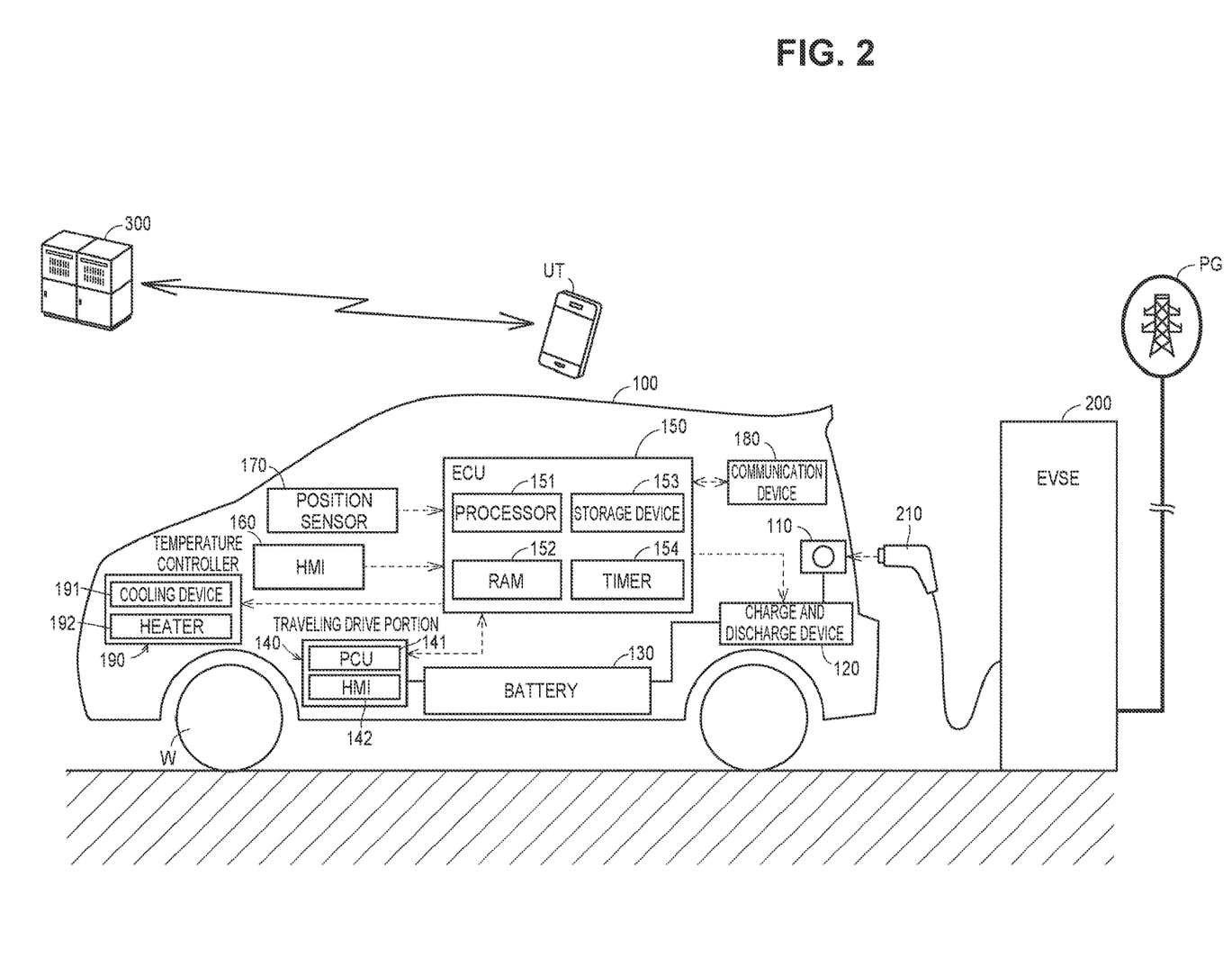
FIG. 2 is a diagram illustrating an example of a configuration of an electric vehicle.

Each electric vehicle 100 included in the vehicle group VG is configured to be operable in an adjustable manner with respect to the electric power system PG. FIG. 2 is a diagram illustrating the configuration of the electric vehicle 100.

As illustrated in FIG. 2, the electric vehicle 100 includes a battery 130 that stores electric power for traveling. The electric vehicle 100 is an electric vehicle (battery electric vehicle (BEV)) without an engine (internal combustion engine). The battery 130 includes a known vehicle electric power storage device (for example, a liquid secondary battery, an all-solid-state secondary battery, or an assembled battery). Examples of secondary batteries for vehicles include lithium ion batteries and nickel-metal hydride batteries. The electric vehicle 100 may be a plug-in hybrid electric vehicle (PHEV).

The electric vehicle 100 includes an electronic control device (hereinafter, referred to as "electronic control unit (ECU)") 150. The ECU 150 performs charge control and discharge control of the battery 130.

The electric vehicle 100 is configured to be electrically connectable to, for example, electric vehicle supply equipment (EVSE) 200 illustrated in FIG. 2. The EVSE 200 corresponds to an electric power supply facility outside the vehicle. The EVSE 200 is electrically connected to the electric power system PG, and is configured to receive electric power from the electric power system PG to supply electric power. A charging cable 210 is connected to a main body of the EVSE 200.

The electric vehicle 100 includes an inlet 110 and a charge and discharge device 120. By connecting the charging cable 210 of the EVSE 200 to the inlet 110 of the electric vehicle 100, the electric vehicle 100 is switched to a state of being electrically connected to the electric power system PG via the EVSE 200 (hereinafter, also referred to as a "plug-in state"). The charge and discharge device 120 is controlled by the ECU 150.

In the electric vehicle 100 which is in the plug-in state, external charging (charging the battery 130 by electric power from the outside of the vehicle) and external electric power supply (electric power supply supplied to the outside of the vehicle by the electric power of the battery 130) are possible. The electric vehicle 100 can adjust the electric power of the electric power system PG by external charging and external electric power supply.

The ECU 150 includes a processor 151, a random access memory (RAM) 152, a storage device 153, and a timer 154. The ECU 150 may be a computer or a central processing unit (CPU). The RAM 152 functions as a working memory for temporarily storing the data processed by the processor 151. The storage device 153 is configured to be able to save the stored information. In addition to the program, the storage device 153 stores information (for example, maps, mathematical formulas, and various parameters) used in the program. The processor 151 executes the program stored in the storage device 153, in such a manner that various controls in the ECU 150 are executed. The timer 154 is configured to notify the processor 151 of the arrival of the set time. Further, the ECU 150 can acquire the current time by using a real-time clock (RTC) circuit (not illustrated) built in the ECU 150.

The electric vehicle 100 further includes a traveling drive unit 140, a human machine interface (HMI) 160, a position sensor 170, a communication device 180, a temperature controller 190, and a drive wheel W. The HMI 160 includes an input device and a display device. The HMI 160 may include a touch panel display. The HMI 160 may include a smart speaker that accepts voice input. The position sensor 170 is configured to detect the position of the electric vehicle 100 and output the detection result to the ECU 150. The position sensor 170 may be a sensor using a global positioning system (GPS).

The traveling drive unit 140 includes a power control unit (PCU) 141 and a motor generator (MG) 142, and is configured to drive the electric vehicle 100 using the electric power stored in the battery 130. The PCU 141 is controlled by the ECU 150.

The MG 142 is, for example, a three-phase alternating current motor generator. The MG is driven by the PCU 141 and is configured to rotate the drive wheel W. The PCU 141 drives the MG using the electric power supplied from the battery 130. Further, the MG 142 is configured to perform regenerative electric power generation and supply the generated electric power to the battery 130.

The communication device 180 includes various communication interfaces (I/Fs). The ECU 150 is configured to communicate with an external device outside the electric vehicle 100 through the communication device 180. The communication device 180 includes a wireless communication device (for example, a data communication module (DCM)) that can access a mobile communication network (telematics). The wireless communication device may include a communication I/F compatible with a fifth generation mobile communication system (5G). The electric vehicle 100 may perform wireless communication with the server 300 in both a plug-in state and a plug-out state (a state in which the electric vehicle 100 and the electric power system PG are electrically cut off).

The temperature controller 190 that regulates the temperature in the vehicle cabin of the electric vehicle 100 includes a cooling device 191 and a heater 192. For example, the cooling device 191 may be an air conditioner provided with an electric compressor, and the heater 192 may be an electric water heater. Each of the cooling device 191 and the heater 192 is controlled by the ECU 150 and consumes the electric power of the battery 130. The configuration of the electric vehicle 100 described above is only an example.

A mobile terminal UT is a terminal carried by a user of the electric vehicle 100. The mobile terminal UT includes, for example, a smartphone equipped with a touch panel display. However, the mobile terminal UT is not limited to this, and the mobile terminal UT can adopt any mobile terminal, and may include a laptop, a tablet terminal, a wearable device (for example, a smart watch or smart glasses), an electronic key, and the like.

The mobile terminal UT is registered in the server 300 in advance, and is configured to be capable of wireless communication with the server 300.

In this embodiment, the mobile terminal UT includes a position sensor. The position sensor may be a sensor using GPS. The mobile terminal UT transmits information (hereinafter, also referred to as "user position information") indicating the user's position to the server 300 periodically or in response to a request from the server 300.

The mobile terminal UT predicts a traveling plan of the electric vehicle 100 by using the above user position information. Examples of traveling plans include boarding time (or departure time), return time, and destination (or travel route to the destination). For example, the mobile terminal UT may predict the time when the user boards the electric vehicle 100 based on the transition of the position of the user who alighted from the electric vehicle 100. The mobile terminal UT may function as an electronic key for the electric vehicle 100. When the user locks the door of the electric vehicle 100 using the mobile terminal UT after alighting from the electric vehicle 100, the position of the mobile terminal UT at the time of alighting from may be registered in the mobile terminal UT as the parking position of the electric vehicle 100, and tracking (position detection by the position sensor and recording of the users position) of the users position by the mobile terminal UT may be started. The mobile terminal UT may learn the user's behavior pattern from historical data (for example, weather information, traffic jam information, and past position data managed separately day by day).

The mobile terminal UT transmits the above traveling plan to the server 300. Further, the traveling plan set by the user in the mobile terminal UT may be transmitted from the mobile terminal UT to the server 300. The schedule set in a scheduler application or an alarm clock application installed in the mobile terminal UT may be automatically transmitted to the server 300. Further, the traveling plan set by the user in a navigation system (not illustrated) of the electric vehicle 100 may be transmitted to the server 300. When the traveling plan of the electric vehicle 100 is changed, the latest traveling plan may be transmitted from the mobile terminal UT (or from the electric vehicle 100) of the user of the electric vehicle 100 to the server 300.

The on (operation)/off (stop) of the vehicle system (system for controlling the electric vehicle 100) including the ECU 150 is switched by the user operating a start switch (not illustrated). Generally, the start switch is referred to as a "power switch" or an "ignition switch".

With reference to FIG. 1 again, the server 600 corresponds to a computer belonging to an aggregator. An aggregator is an electric power company that provides energy management services by bundling a plurality of distributed energy resources (hereinafter, also referred to as "DER"). Each electric vehicle 100 included in the vehicle group VG can function as a DER. The server 600 may function these DERs as virtual power plants (VPPs) by remotely and integratedly controlling the plurality of DERs (including the vehicle group VG). The server 600 may perform demand response (DR) for each DER.

The server 600 can cause the DER (for example, the battery 130 illustrated in FIG. 2) to perform charging or discharging for electric power adjustment of the electric power system PG by remote control. For example, when an imbalance occurs, the server 600 controls the DER (for example, charge and discharge device 120 illustrated in FIG. 2) to eliminate the imbalance.

Figure 3:
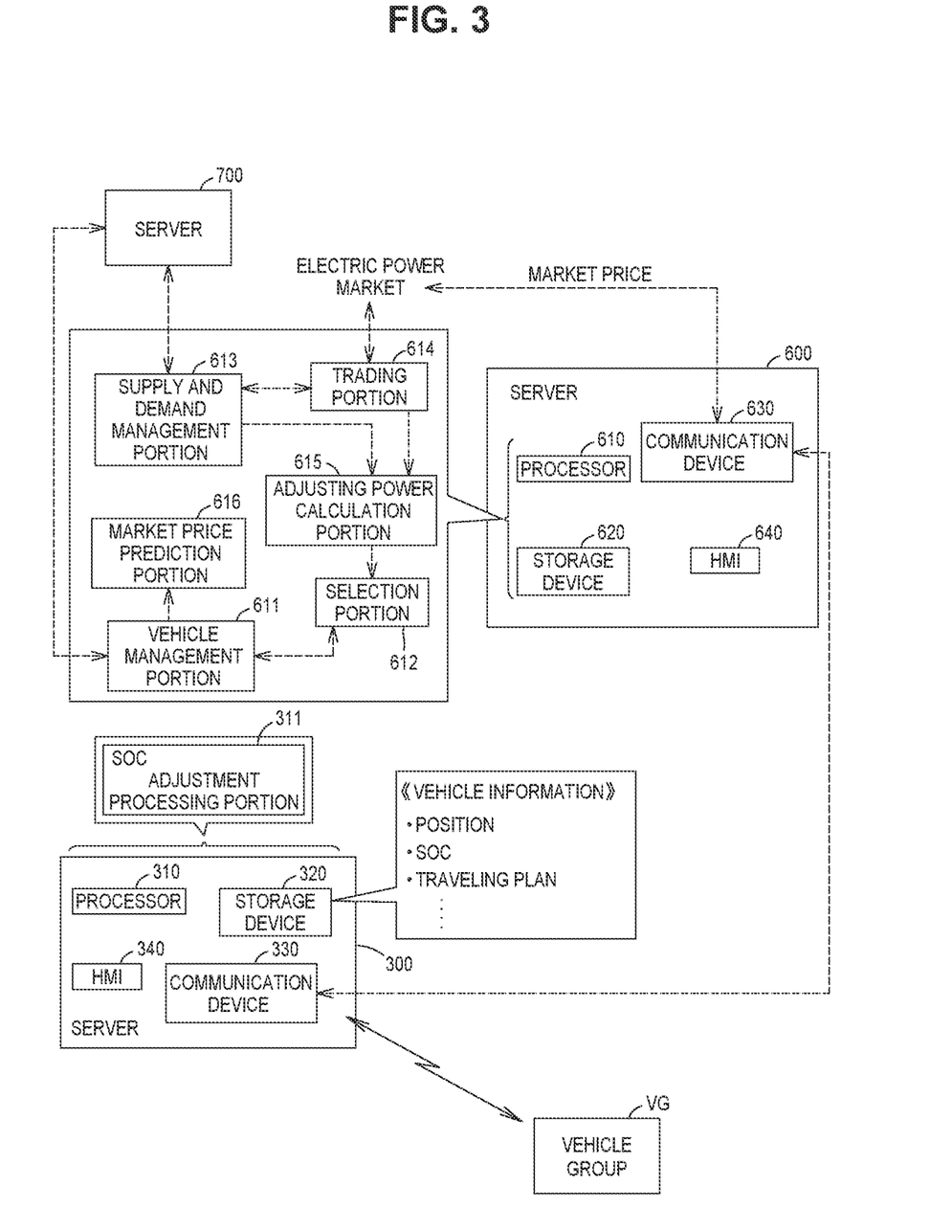
FIG. 3 is a diagram illustrating a detailed configuration of an electric vehicle management device according to the embodiment of the present disclosure.

FIG. 3 is a diagram illustrating a detailed configuration of the server 300 and the server 600. With reference to FIG. 3, the servers 300, 600 respectively include processors 310, 610, storage devices 320, 620, communication devices 330, 630, and HMIs 340, 640. The communication device 630 acquires information on the market price of electric power by communication. The communication device 330 and the communication device 630 communicate with each other. The communication device 630 and the communication device 330 are examples of the "communication unit" of the present disclosure. Further, the processor 310 and the processor 610 are examples of the "control unit" of the present disclosure.

Each of the storage device 320 and the storage device 620 is configured to be able to save various information. In the storage devices 320, 620, in addition to the programs executed by the processors 310, 610, pieces of information (for example, maps, mathematical formulas, and various parameters) used in the programs are stored. Each of the communication device 330 and the communication device 630 includes various communication interfaces (I/Fs). Each of the HMI 340 and the HMI 640 includes an input device and a display device.

The server 300 is configured to manage information (hereinafter, also referred to as "vehicle information") regarding each electric vehicle 100 included in the vehicle group VG. The vehicle information is stored in the storage device 320 of the server 300. Specifically, identification information (vehicle ID) for identifying the electric vehicle 100 is assigned to each electric vehicle 100, and the server 300 manages the vehicle information by distinguishing it by the vehicle ID. The vehicle ID may be a unique number (for example, vehicle identification number (VIN)) for each electric vehicle 100, or may be a communication address of the electric vehicle 100. The vehicle information includes, for example, the position of the electric vehicle 100, the state of charge (SOC) of the battery 130 included in the electric vehicle 100, the traveling plan of the electric vehicle 100, the system connection state (plug-in state/plug-out state), and the state (on/off) of the vehicle system. Further, the specifications (for example, the specifications related to charging and discharging) of the electric vehicle 100 may be registered in the server 300 in advance.

Further, the server 300 periodically communicates with each electric vehicle 100. Specifically, the server 300 repeatedly executes the process illustrated in FIG. 7 described below.

Further, the server 600 includes a vehicle management unit 611, a selection unit 612, a supply and demand management unit 613, a trading unit 614, an adjusting power calculation unit 615, and a market price prediction unit 616. Each of these units is embodied, for example, by the processor 610 and a program executed by the processor 610. However, the present disclosure is not limited to this, and each of the above units may be embodied by dedicated hardware (electronic circuit).

The vehicle management unit 611 acquires the data managed by the server 300 as needed. In addition, the vehicle management unit 611 predicts the future behavior of the electric vehicle 100 based on the data acquired from the server 300.

The vehicle management unit 611 operates the vehicle selected by the selection unit 612 as the adjusting power of the electric power system PG by remote control.

The supply and demand management unit 613 acquires the supply and demand information of the electric power system PG from the server 700. In addition, the supply and demand management unit 613 monitors the actual supply and demand of the electric power system PG. When an imbalance occurs with respect to the simultaneous equal amount of the electric power system PG, the supply and demand management unit 613 generates an adjusting power request for eliminating the imbalance.

The trading unit 614 conducts transactions in the electricity market. The trading unit 614 executes a bid in the electricity market and informs the supply and demand management unit 613 of the bid result. When the trading unit 614 makes a successful bid in the electricity market, the trading unit 614 generates an adjusting power request.

The adjusting power calculation unit 615 calculates a target adjusting power for the adjusting power request. The selection unit 612 selects the electric vehicle 100 to be operated as the adjusting power from the plurality of electric vehicles 100 included in the vehicle group VG in response to the adjusting power request described above. The selection unit 612 informs the vehicle management unit 611 of the selected electric vehicle 100.

Figure 4:
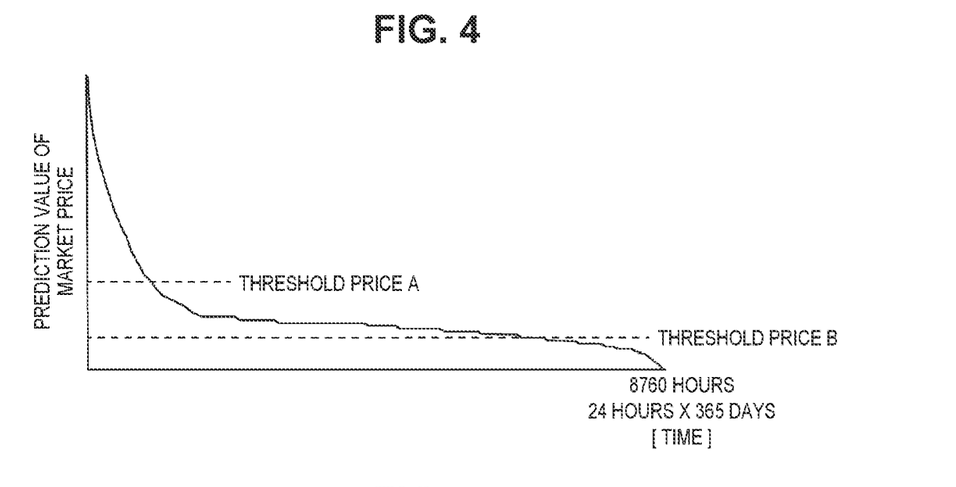
FIG. 4 is a diagram illustrating changes in prediction values of market prices.

The market price prediction unit 616 calculates a prediction value of the market price based on the market price information acquired by the communication device 630. In particular, the market price prediction unit 616 (processor 610) detects (calculates) the scheduled time when the next charge of the traveling electric vehicle 100 is performed, and calculates the prediction value of the market price at the detected (calculated) scheduled time. The graph illustrated in FIG. 4 shows a relationship between the annual prediction value predicted by the market price prediction unit 616 and the time. The process of detecting (calculating) the scheduled time when the next charge is performed may be performed by the processor 310 of the server 300.

The market price prediction unit 616 (processor 610) detects (calculates) the scheduled time for the next charge based on the future behavior of the electric vehicle 100 predicted by the vehicle management unit 611. Further, the market price prediction unit 616 (processor 610) may detect (calculate) the scheduled time when the next charge of the electric vehicle 100 selected by the selection unit 612 is performed.

Further, the server 300 includes an SOC adjustment processing unit 311. The SOC adjustment processing unit 311 is embodied by, for example, the processor 310 and a program executed by the processor 310. However, the present disclosure is not limited to this, and the SOC adjustment processing unit 311 may be embodied by dedicated hardware (electronic circuit).

The SOC adjustment processing unit 311 performs an SOC adjustment process for adjusting the SOC of the traveling electric vehicle 100. Here, when the SOC is adjusted without considering the market price of the electric power, for example, when the price of the electric power is high, the adjustment is made to lower the SOC of the electric power of the electric vehicle, and the cost for the next charging becomes large. Therefore, it is considered that the user of the electric vehicle 100 may feel financial anxiety (dissatisfaction) with respect to charging.

Therefore, in the present embodiment, the processor 310 (SOC adjustment processing unit 311) performs the SOC adjustment process based on the prediction value of the market price of the electric power calculated by the market price prediction unit 616. Specifically, the processor 310 (SOC adjustment processing unit 311) transmits a command signal to the electric vehicle 100 to perform the SOC adjustment process based on the prediction value of the market price of the electric power. The SOC of the electric vehicle 100 is adjusted between the start of the SOC adjustment process and the next charging.

Further, the processor 310 compares the prediction value of the market price of electric power calculated by the market price prediction unit 616 with a predetermined threshold price. Then, the SOC adjustment processing unit 311 (processor 310) performs the SOC adjustment process based on a magnitude correlation between the prediction value of the market price and the predetermined threshold price. The comparison between the prediction value of the market price and the predetermined threshold price may be performed by the processor 610.

The predetermined threshold price includes a threshold price A and a threshold price B. Here, FIG. 4 illustrates a graph showing the relationship between the prediction value of the market price and time. As illustrated in FIG. 4, the threshold price B is smaller than the threshold price A. Each of the threshold price A and the threshold price B is stored in the storage device 320 (or storage device 620) in advance. Further, each of the threshold price A and the threshold price B may be appropriately calculated based on predetermined information (for example, a transition of the market price of electric power), instead of a fixed value as described above. The threshold price A and the threshold price B are respectively examples of a "first threshold price" and a "second threshold price" of the present disclosure.

In the present embodiment, the SOC adjustment processing unit 311 (processor 310) performs an SOC reduction process for reducing a decrease in the SOC of the traveling electric vehicle 100 when the prediction value of the market price of electric power is equal to or higher than the threshold price A. As a result, it is possible to reduce the SOC from becoming relatively low at the time when the market price is expected to be relatively high. As a result, it is possible to reduce an increase in the cost for charging the electric vehicle 100, such that it is possible to easily reduce the amount of financial anxiety (dissatisfaction) the user feels. Further, as illustrated in FIG. 4, the threshold price A is smaller than, for example, ½ of the maximum value of the prediction values of the market price in one year. The example of the size of the threshold price A is not limited to this.

Figure 5:
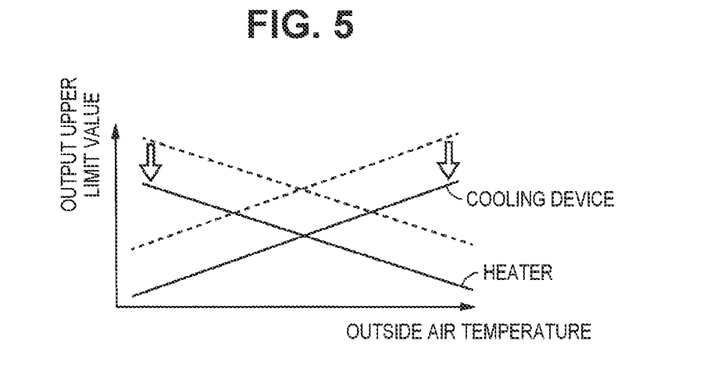
FIG. 5 is a diagram illustrating an example of an SOC reduction process.

FIG. 5 illustrates a graph showing a relationship between the outside air temperature and the output upper limit value of the temperature controller 190 (cooling device 191 and heater 192). As illustrated in FIG. 5, the SOC reduction process includes, for example, a process (an example of the "first process" of the present disclosure) of lowering the output upper limit value of the temperature controller 190 of the electric vehicle 100 as compared with the case (the case where the prediction value of the market price of electric power is larger than the threshold price B and smaller than the threshold price A) where the prediction value of the market price of electric power is less than the threshold price A. In FIG. 5, the change in the output upper limit value after the SOC reduction process is shown by a solid line, and the change in the output upper limit value before the SOC reduction process is shown by a broken line.

Specifically, the SOC reduction process includes a process of lowering the output upper limit value of each of the cooling device 191 and the heater 192. The output upper limit value of the cooling device 191 may be controlled by the evaporator outlet temperature, and the output upper limit value of the heater 192 may be controlled by the supply electric power. The amount of decrease in the output upper limit value due to the SOC reduction process is, for example, a preset fixed value. The amount of decrease may be calculated based on, for example, the magnitude of a difference between the prediction value of the market price of electric power and the threshold price A.

Further, each of the cooling device 191 and the heater 192 changes the output upper limit value according to the outside air temperature. Specifically, the output upper limit value of the cooling device 191 increases as the outside air temperature increases. The output upper limit value of the heater 192 increases as the outside air temperature decreases. Here, the rate of change of the output upper limit value with respect to the outside air temperature may be the same or different before and after the SOC reduction process is performed. Further, the amount of decrease in the output upper limit value due to the SOC reduction process of each of the cooling device 191 and the heater 192 may be the same or different from each other. Further, only the output upper limit value of either the cooling device 191 or the heater 192 may be lowered by the SOC reduction process.

The SOC reduction process is not limited to the example described above. For example, the decrease in the SOC may be reduced by increasing the regenerative strength due to braking.

Further, the SOC adjustment process performs an SOC promotion process for promoting a decrease in the SOC of the traveling electric vehicle 100, for example, when the prediction value of the market price of electric power is equal to or less than the threshold price B (see the broken line in FIG. 5). For example, the threshold price B is smaller than ½ of the threshold price A. The example of the size of the threshold price B is not limited to this.

Figure 6:
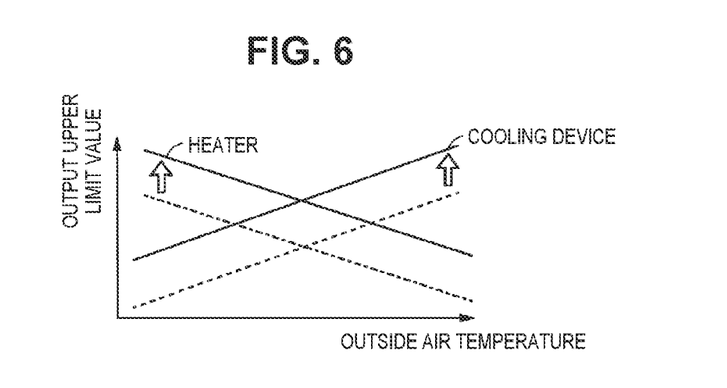
FIG. 6 is a diagram illustrating an example of an SOC promotion process.

FIG. 6 is a graph showing a relationship between the outside air temperature and the output upper limit value of the temperature controller 190 (cooling device 191 and heater 192). As illustrated in FIG. 6, the SOC promotion process includes, for example, a process of increasing the output upper limit value of the temperature controller 190 of the electric vehicle 100 as compared with the case (the case where the prediction value of the market price of electric power is larger than the threshold price B and smaller than the threshold price A) where the prediction value of the market price of electric power is larger than the threshold price B. In FIG. 6, the change in the output upper limit value after the SOC promotion process is shown by a solid line, and the change in the output upper limit value before the SOC promotion process is shown by a broken line.

Specifically, the SOC promotion process includes a process of increasing the output upper limit value of each of the cooling device 191 and the heater 192. The amount of increase in the output upper limit value due to the SOC promotion process is, for example, a preset fixed value. The amount of increase may be calculated based on, for example, the magnitude of a difference between the prediction value of the market price of electric power and the threshold price B.

Further, the rate of change of the output upper limit value with respect to the outside air temperature may be the same or different before and after the SOC promotion process is performed. Further, the amount of increase in the output upper limit value due to the SOC promotion process of each of the cooling device 191 and the heater 192 may be the same or different from each other. Further, only the output upper limit value of either the cooling device 191 or the heater 192 may be increased by the SOC promotion process.

The SOC promotion process is not limited to the example described above. For example, in a PHEV vehicle, a decrease in the SOC may be promoted by actively using EV driving rather than HV driving. Further, in the BEV vehicle, the reduction of the SOC may be promoted by switching to a power mode in which the output of the MG 142 is emphasized. As a result, the user can enjoy driving more, and the market price is relatively low at the time of charging after driving, such that it is possible to reduce the user's financial burden.

Control Flow of Electric Vehicle Management Device

Figure 7:
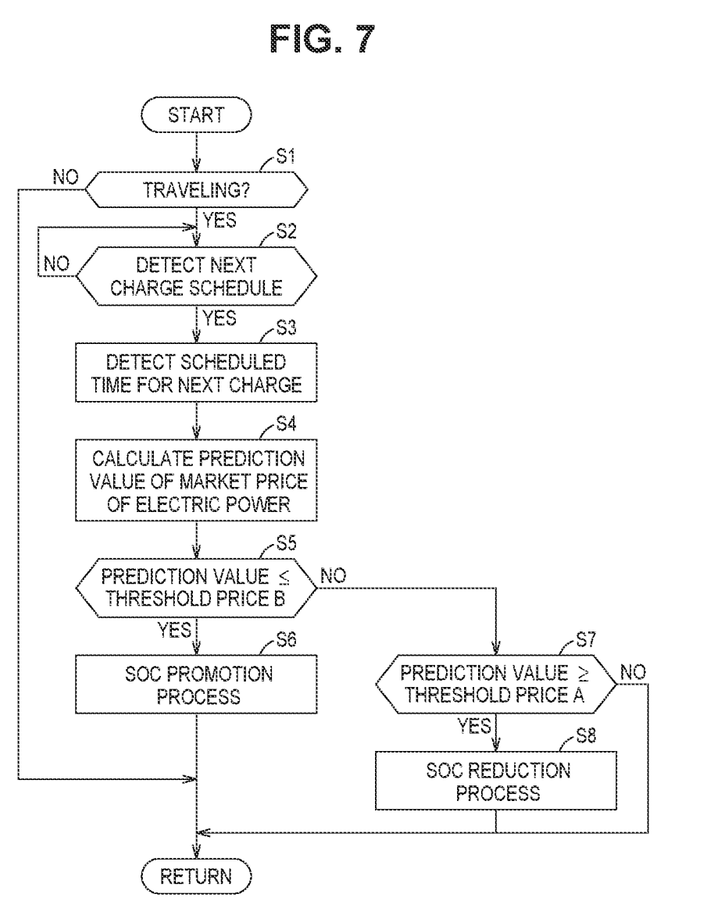
FIG. 7 is a flow chart illustrating processing of the electric vehicle management device.

Next, the control flow of the electric vehicle management device 1000 will be described with reference to FIG. 7.

First, in step S1, it is determined whether the electric vehicle 100 is traveling. In particular, based on the vehicle information (position of the electric vehicle 100, traveling plan of the electric vehicle 100, and the like) of the electric vehicle 100 acquired by the communication device 330 of the server 300, it is determined by the processor 310 that the electric vehicle 100 is traveling. Specifically, the processor 310 determines that the electric vehicle 100 is traveling when the start switch is turned on. When it is determined that the electric vehicle 100 is traveling (Yes in S1), the process proceeds to step S2. When it is determined that the electric vehicle 100 is not traveling (No in S1), the process is returned. The determination in step S1 may be performed by the processor 610 of the server 600.

Next, in step S2, the next charge schedule of the electric vehicle 100 is detected. Specifically, the processor 610 makes the above determination based on the vehicle information (position of the electric vehicle 100, traveling plan of the electric vehicle 100, past traveling data, and the like) of the electric vehicle 100, the information transmitted from the mobile terminal UT, and the like. When it is determined that there is a schedule for the next charge (Yes in S2), the process proceeds to step S3. When it is determined that there is no schedule (undecided) for the next charge (No in S2), the process of step S2 is repeated. The determination in step S2 may be performed by the processor 310 of the server 300.

Next, in step S3, the scheduled time for the next charge of the electric vehicle 100 is detected. Specifically, the scheduled time is calculated based on the vehicle information (position of the electric vehicle 100, traveling plan of the electric vehicle 100, past traveling data, and the like) of the electric vehicle 100 or the information transmitted from the mobile terminal UT. In addition, the scheduled time may be calculated based on traffic congestion information, a personal schedule stored in the mobile terminal UT, or the like. The above process in step S3 may be performed by the processor 310 of the server 300.

Next, in step S4, the prediction value of the market price of electric power at the scheduled time detected in step S3 is calculated. Specifically, the prediction value of the market price is calculated by the processor 610 (market price prediction unit 616) of the server 600.

Next, in step S5, it is determined whether the prediction value of the market price of electric power calculated in step S4 is equal to or less than the threshold price B (see FIG. 4). When the prediction value is equal to or less than the threshold price B (Yes in S5), the process proceeds to step S6. When the prediction value is larger than the threshold price B (No in S5), the process proceeds to step S7.

In step S6, the SOC promotion process is performed. The details of the SOC promotion process are as described above.

Further, in step S7, it is determined whether the prediction value of the market price of electric power calculated in step S4 is equal to or higher than the threshold price A. When the prediction value is equal to or higher than the threshold price A (Yes in S7), the process proceeds to step S8. When the prediction value is smaller than the threshold price A (No in S7), the process is returned.

In step S8, the SOC reduction process is performed. The details of the SOC reduction process are as described above.

The order of steps S5 and S7 may be reversed. Further, the processor 610 (market price prediction unit 616) of the server 600 calculates the prediction value of the market price of electric power before the gate closure of the electric power trading market.

As described above, in the present embodiment, the processor 310 (SOC adjustment processing unit 311) performs the SOC adjustment process for adjusting the SOC of the traveling electric vehicle 100 based on the calculated prediction value of the market price of the electric power. Therefore, the SOC of the traveling electric vehicle 100 is adjusted based on the prediction value of the market price of electric power. As a result, it is possible to adjust the SOC based on the prediction value of the market price so as to reduce the financial burden on the user. Thus, it is possible to reduce the amount of financial anxiety (dissatisfaction) the user of the electric vehicle 100 feels.

Further, in the above embodiment, an example of lowering the output upper limit value of the temperature controller 190 in the SOC reduction process is shown, but the present disclosure is not limited to this. The output of other devices may be changed without lowering the output upper limit value of the temperature controller 190.

Further, in the above embodiment, an example in which the server 300 transmits a command signal to the electric vehicle 100 to perform the SOC adjustment process is shown, but the present disclosure is not limited to this. The server 300 may transmit only the comparison result between the prediction value of the market price of electric power and the threshold price A (B) to the electric vehicle 100. In this case, the electric vehicle 100 executes the SOC reduction process (SOC promotion process) based on the comparison result transmitted from the server 300.

Further, in the above embodiment, an example in which the SOC adjustment process is performed by adjusting the output upper limit value of the temperature controller 190 is shown, but the present disclosure is not limited to this. For example, the server 300 may set a target SOC when the traveling electric vehicle 100 arrives at the destination. In this case, the server 300 may perform adjustment such that an SOC when the electric vehicle 100 arrives at the destination becomes the target SOC by changing (adjusting) the traveling route of the electric vehicle 100, constants (adapted values/thresholds), various maps, electric power consumption amounts, regeneration amounts, and the likes. In this case, for example, by setting the target SOC to 80% in the SOC reduction process and setting the target SOC to 20% in the SOC promotion process, the SOC when charging is performed at the destination can be adjusted based on the market value of electric power.

Figure 8:
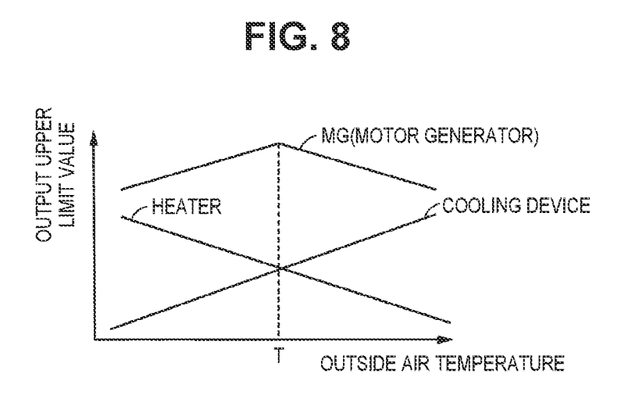
FIG. 8 is a diagram illustrating an example of an SOC reduction process according to a modification example of the present disclosure.

For example, as illustrated in FIG. 8, the SOC reduction process may include a process (an example of a "second process" of the present disclosure) for limiting the output of the MG 142 of the electric vehicle 100 without performing a process of lowering the output upper limit value of the temperature controller 190 of the electric vehicle 100.

In the example illustrated in FIG. 8, when the outside air temperature is a predetermined temperature T, the output upper limit value of the MG 142 becomes maximum. Further, when the outside air temperature is equal to or higher than the predetermined temperature T, the higher the outside air temperature, the lower the output upper limit value of the MG 142. Further, when the outside air temperature is equal to or less than the predetermined temperature T, the output upper limit value of the MG 142 increases as the outside air temperature decreases. This makes it possible to suppress the output (electric power consumption) of the MG 142 when the electric power consumption of the cooling device 191 is large due to the high outside air temperature. Further, when the electric power consumption of the heater 192 is large due to the low outside air temperature, it is possible to suppress the output (electric power consumption) of the MG 142. As a result, the decrease in the SOC of the electric vehicle 100 is suppressed.

Further, in the embodiment described above, an example in which the electric vehicle management device 1000 includes the server 300 and the server 600 is shown, but the present disclosure is not limited to this. The electric vehicle management device 1000 may include only one server having the functions of both the server 300 and the server 600.

The above-described various modification examples may be carried out in any combination. The embodiments disclosed herein should be considered to be exemplary and not restrictive in all respects. The scope of the present disclosure is set forth by the claims rather than the description of the embodiments described above, and is intended to include all modifications within the meaning and scope equivalent to the scope of claims.

What is claimed is:

1. An electric vehicle management device that manages an electric vehicle that is chargeable by an electric power system, the electric vehicle management device comprising:
 a communication unit configured to acquire information on a market price of electric power by communication, and communicate with the electric vehicle; and
 a control unit configured to calculate a prediction value of the market price based on the information on the market price acquired by the communication unit,
 wherein the control unit is configured to perform a state-of-charge (SOC) adjustment process for adjusting an SOC of the electric vehicle during traveling based on the calculated prediction value, and perform the SOC adjustment process based on a magnitude correlation between the prediction value and a predetermined threshold price.

2. The electric vehicle management device according to claim 1, wherein:
 the predetermined threshold price includes a first threshold price;
 the SOC adjustment process includes an SOC reduction process for reducing a decrease in the SOC of the electric vehicle during traveling; and
 the control unit is configured to perform the SOC reduction process when the prediction value is equal to or higher than the first threshold price.

3. The electric vehicle management device according to claim 2, wherein the SOC reduction process includes a first process for lowering an output upper limit value of a temperature controller of the electric vehicle as compared with a case where the prediction value is less than the first threshold price.

4. The electric vehicle management device according to claim 2, wherein the SOC reduction process includes a second process for limiting an output of a motor generator of the electric vehicle without performing a process for lowering the output upper limit value of the temperature controller of the electric vehicle.

5. The electric vehicle management device according to claim 2, wherein:
 the predetermined threshold price includes a second threshold price smaller than the first threshold price;
 the SOC adjustment process includes an SOC promotion process for promoting a decrease in the SOC of the electric vehicle during traveling; and
 the control unit is configured to perform the SOC promotion process when the prediction value is equal to or less than the second threshold price.

6. The electric vehicle management device according to claim 1, wherein the control unit is configured to:
 detect a scheduled time at which next charging is executed;
 calculate the prediction value at the scheduled time; and
 perform the SOC adjustment process based on the prediction value.

7. The electric vehicle management device according to claim 1, wherein the control unit is configured to:
 detect a scheduled time at which next charging is executed; and
 perform the SOC adjustment process based on detection of the scheduled time.

8. The electric vehicle management device according to claim 1, wherein the control unit is configured to calculate the prediction value before gate closure of an electric power trading market.

9. An electric vehicle management system comprising:
 an electric vehicle that is chargeable by an electric power system; and
 an electric vehicle management device configured to manage the electric vehicle, wherein:
 the electric vehicle management device includes:

a communication unit configured to acquire information on a market price of electric power by communication and communicate with the electric vehicle; and a control unit configured to calculate a prediction value of the market price based on the information on the market price acquired by the communication unit; and the control unit is configured to perform a process for adjusting an SOC of the electric vehicle during traveling based on the calculated prediction value, and perform the SOC adjustment process based on a magnitude correlation between the prediction value and a predetermined threshold price.

* * * * *